US011360211B2

(12) United States Patent
Cheng

(10) Patent No.: US 11,360,211 B2
(45) Date of Patent: Jun. 14, 2022

(54) METHOD AND APPARATUS FOR DETERMINING STATIC STATE OF OBSTACLE

(71) Applicant: BAIDU ONLINE NETWORK TECHNOLOGY (BEIJING) CO., LTD., Beijing (CN)

(72) Inventor: Kai Cheng, Beijing (CN)

(73) Assignee: Apollo Intelligent Driving Technology (Beijing) Co., Ltd., Beijing (CN)

(*) Notice: Subject to any disclaimer, the term of this patent is extended or adjusted under 35 U.S.C. 154(b) by 369 days.

(21) Appl. No.: 16/561,595

(22) Filed: Sep. 5, 2019

(65) Prior Publication Data

US 2020/0081118 A1    Mar. 12, 2020

(30) Foreign Application Priority Data

Sep. 7, 2018 (CN) .......................... 201811043093.0

(51) Int. Cl.
*G01S 13/931* (2020.01)
*B60W 30/095* (2012.01)
(Continued)

(52) U.S. Cl.
CPC ....... *G01S 13/931* (2013.01); *B60W 30/0956* (2013.01); *G01S 13/58* (2013.01);
(Continued)

(58) Field of Classification Search
CPC .................. G01S 13/931; G01S 13/58; G06K 9/00805; B60W 30/0956
See application file for complete search history.

(56) References Cited

U.S. PATENT DOCUMENTS 5,537,118 A * 7/1996 Appriou ................ G01S 13/726
                                                     342/95
5,963,653 A * 10/1999 McNary .................. G01S 7/417
                                                     342/109
(Continued)

FOREIGN PATENT DOCUMENTS

CN    101519981 A    9/2009
CN    101697006 A    4/2010

OTHER PUBLICATIONS

European Patent Application No. EP19195475.9 extended Search and Opinion dated Feb. 4, 2020, 9 pages.
(Continued)

*Primary Examiner* — Peter M Bythrow
(74) *Attorney, Agent, or Firm* — Lathrop GPM LLP

(57) ABSTRACT

Embodiments of the present disclosure disclose a method and an apparatus for determining a static state of an obstacle, a device and a storage medium. The method includes the following. Real-time obstacle velocities are obtained by detecting an obstacle via at least two sensors. A belief function assignment value of each sensor is calculated for at least two status parameters respectively according to the real-time obstacle velocity corresponding to each sensor. The belief function assignment value of each sensor is fused for each status parameter with a D-S evidence combination technology to obtain a fused belief function assignment value corresponding to each status parameter. A static state of the obstacle is judged according to the fused belief function assignment value corresponding to each status parameter.

18 Claims, 4 Drawing Sheets

(51) Int. Cl.
*G01S 13/58* (2006.01)
*G06V 20/58* (2022.01)

(52) U.S. Cl.
CPC ......... *G06V 20/58* (2022.01); *B60W 2554/00* (2020.02); *G01S 2013/9322* (2020.01)

(56) References Cited

U.S. PATENT DOCUMENTS

| | | | | |
|---|---|---|---|---|
| 7,424,466 | B2* | 9/2008 | Talbot | G06N 7/005 706/46 |
| 7,447,670 | B1* | 11/2008 | Chen | G06N 7/005 706/52 |
| 7,576,681 | B2* | 8/2009 | Chen | G06K 9/3241 342/175 |
| 10,160,448 | B2* | 12/2018 | Liu | B60W 10/20 |
| 10,852,420 | B2* | 12/2020 | Chondro | G01S 7/414 |
| 2010/0114490 | A1* | 5/2010 | Becker | G01S 13/931 701/301 |
| 2011/0050481 | A1* | 3/2011 | Itoh | G01S 13/345 342/27 |
| 2011/0213747 | A1* | 9/2011 | Siebecker | G06N 5/04 706/52 |
| 2012/0005149 | A1* | 1/2012 | Chen | G06N 5/04 706/52 |
| 2013/0222176 | A1* | 8/2013 | Ishimori | G01S 13/584 342/70 |
| 2014/0114885 | A1* | 4/2014 | Han | G06N 20/00 706/12 |
| 2015/0310146 | A1* | 10/2015 | Tanzmeister | G08G 1/165 703/2 |
| 2017/0185850 | A1* | 6/2017 | Hsu | B60W 30/09 |
| 2018/0345958 | A1* | 12/2018 | Lo | G08G 1/096725 |
| 2019/0050653 | A1* | 2/2019 | Natroshvili | G06K 9/00805 |
| 2019/0072973 | A1* | 3/2019 | Sun | B62D 15/0255 |
| 2021/0073321 | A1* | 3/2021 | Steyer | G06K 9/00805 |
| 2021/0131823 | A1* | 5/2021 | Giorgio | G01S 17/86 |

OTHER PUBLICATIONS

Chinese Patent Application No. 201811043093.0 Office Action dated Mar. 25, 2020; 11 pages.

Chinese Patent Application No. 201811043093.0 English translation of Office Action dated Mar. 25, 2020; 17 pages.

Ding, H. et al.; "Data Fusion Algorithm Based on Fuzzy Logic"; Proc. of the 5thWorld Congress on Intelligent Control and Automation; Jun. 15-19, 2004, pp. 3101-3103.

Zheng, X. et al.; "A novel intelligent vehicle risk assessment method combined with multi-sensor fusion in dense traffic environment"; Journal of Intelligent and Connected Vehicles, vol. 1, No. 2; Jun. 11, 2018; pp. 41-54.

Jiang, W. et al.; "Reliability-Based Method to Sensor Data Fusion" Sensors vol. 17, No. 7, Jul. 5, 2017; 20 pages.

Liu, Y. et al.; "Application of D-S Evidential Theory for Mobile Robotic Obstacle Avoidance" (2009), 3 pages.

Kang, J.; "The Key Technology Research of Multi—sensors Information Fusion" dissertation Mar. 2013; Harbin Engineering Univ; 139 pages.

"Research on Near-field Obstacle Detection and Motion State Estimation Method for Intelligent Vehicle" (2016) 80 pages.

* cited by examiner

METHOD AND APPARATUS FOR DETERMINING STATIC STATE OF OBSTACLE

CROSS REFERENCE TO RELATED APPLICATIONS

This application claims priority and benefits to Chinese Application No. 201811043093.0, filed on Sep. 7, 2018, the entire content of which is incorporated herein by reference.

FIELD

The present disclosure relates to a field of data processing technology, and more particularly, to a method and an apparatus for determining a static state of an obstacle, a device and a storage medium.

BACKGROUND

In recent years, with continuous development of a sensor technology, a control system and an artificial intelligence technology, a great progress is made in an unmanned driving vehicle (hereinafter referred to as an unmanned vehicle) and a ground mobile robot. In a real dynamic environment, taking an unmanned vehicle as an example, it is necessary for the unmanned vehicle to detect an obstacle stably and accurately and identify a movement state type of the obstacle in an environmental perception, which is of great help to a path planning and a motion model establishment, such that the unmanned vehicle may make various intelligent decisions.

SUMMARY

Embodiments of the present disclosure provide a method for determining a static state of an obstacle. The method includes: obtaining real-time obstacle velocities by detecting an obstacle via at least two sensors; calculating a belief function assignment value of each sensor for at least two status parameters respectively according to the real-time obstacle velocity corresponding to each sensor; fusing the belief function assignment value of each sensor for each status parameter with a D-S evidence combination technology to obtain a fused belief function assignment value corresponding to each status parameter; and judging a state of the obstacle according to the fused belief function assignment value corresponding to each status parameter.

Embodiments of the present disclosure provide a computer device, including: one or more processors; and a memory configured to store one or more programs that when executed by the one or more processors cause the one or more processors to perform the method for determining a static state of an obstacle according to any of embodiments of the present disclosure.

Embodiments of the present disclosure provide a computer readable storage medium, having computer programs stored thereon that when executed by a processor cause the processor to perform the method for determining a static state of an obstacle according to any of embodiments of the present disclosure.

DETAILED DESCRIPTION

Figure 1:
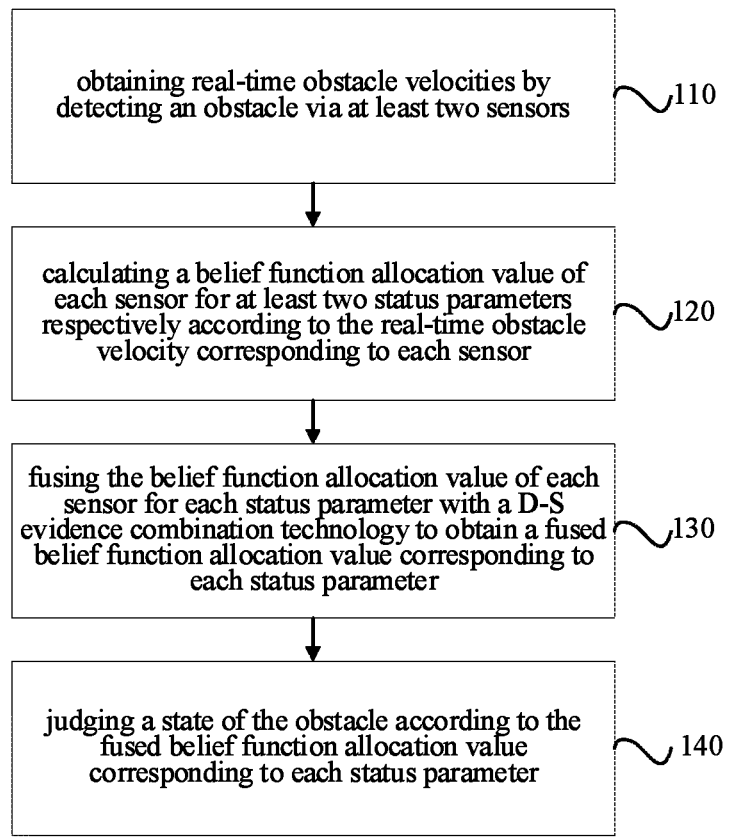
FIG. 1 is a flow chart illustrating a method for determining a static state of an obstacle according to embodiments of the present disclosure.

The present disclosure will be described in detail below with reference to the accompanying drawings and the embodiments. It should be understood that, the specific embodiments described herein are only used to explain the present disclosure rather than to limit the present disclosure.

In addition, it should also be noted that, for convenience of description, only part but not all structures related to the present disclosure are illustrated in the accompanying drawings. Before discussing example embodiments in more detail, it is noted that, some example embodiments are described as processes or methods depicted as flow charts. Although the flow charts describe operations (or steps) as a sequential processing, but many of these operations may be performed in parallel, concurrently, or simultaneously. In addition, the order of the operations may be rearranged. The processing may be terminated when its operation is complete, but may also have additional steps not included in the attached diagram. The processing may correspond to a method, a function, a procedure, a subroutine, a subprogram, and the like.

At present, it is key to judge whether the obstacle is in a static state in an unmanned vehicle system. A judging result may provide important information for subsequent prediction and decision-making control. In related arts, velocity information output by various single sensors configured in the unmanned vehicle may be mainly used to determine whether the obstacle is in the static state.

In related arts, during a process of realizing the present disclosure, the inventor finds that each single sensor has a limitation of hardware and the single sensor does not contain redundant information, making it difficult to judge the state of the obstacle stably and reliably. Thus, a misjudgment is likely to occur.

Therefore, embodiments of the present disclosure provide a method and an apparatus for determining a static state of an obstacle, a device and a storage medium, to ensure an independence of an algorithm module and a function integrity of a whole integration system.

According to embodiments of the present disclosure, based on the real-time obstacle velocities obtained by detecting the obstacle via the at least two sensors, the belief function assignment value of each sensor may be calculated for the at least two status parameters respectively; the belief function assignment value of each sensor is fused with the D-S evidence combination technology to obtain the fused belief function assignment value corresponding to each status parameter respectively. A state of the obstacle is judged according to the fused belief function assignment value corresponding to each status parameter. In the present disclosure, the state of the obstacle may be determined based on the obstacle velocity obtained by multiple sensors. A problem of an inaccurate and unreliable judgement and a misjudgment on the state of the obstacle existing in an unmanned vehicle system may be solved. In addition, in the unmanned vehicle system, independency of algorithm modules and function integrity of a whole integration system may be ensured when judging the state of the obstacle. Thus, a stability, a reliability and an accuracy of judging the state of the obstacle by the unmanned vehicle system may be improved.

FIG. 1 is a flow chart illustrating a method for determining a static state of an obstacle according to embodiments of the present disclosure. The embodiment may be applicable to an unmanned vehicle system to determine the static state of the obstacle. The method may be executed by an apparatus for determining a static state of an obstacle. The apparatus may be implemented in hardware and/or software and generally may be integrated in a computer device configured in a vehicle. Correspondingly, as illustrated in FIG. 1, the method may include the following.

At block 110, real-time obstacle velocities are obtained by detecting a same obstacle via at least two sensors.

The real-time obstacle velocity may be a velocity of an obstacle detected by a sensor at a certain time point.

In embodiment of the present disclosure, in order to accurately determine a static state of the obstacle, instead of using a single sensor to measure velocity information of the obstacle to determine whether the obstacle is in the static state, multiple sensors may be used for measuring the velocity information. In detail, at least two real-time obstacle velocities may be obtained by detecting the same obstacle via the at least two sensors.

At block 120, for each of at least two status parameters, a belief function assignment value is calculated for each sensor respectively according to a respective real-time obstacle velocity corresponding to each sensor.

The belief function is a mathematical tool for describing a subjective uncertainty. The status parameter may be a parameter of the belief function that is available for evaluating an obstacle status. Correspondingly, the belief function assignment value may be a value corresponding to each status parameter. It should be noted that, a sum of all assignment values is 1.

In an example, the status parameter may be static, non-static, and unknown.

In embodiments of the present disclosure, the status parameter may include a status static parameter, a non-static status parameter, and an unknown status parameter. The status parameter corresponding to the belief function of the sensor may include at least two of the static status parameter, the non-static status parameter, and the unknown status parameter. The static status parameter may represent a static state of the obstacle, while the non-static status parameter may represent a non-static state of the obstacle. In addition, the unknown status parameter may be set to reflect a probability of an occurrence of a status of an unknown type considering factors such as a self-interference or error of the sensor. That is, the unknown status parameter may be a complete set of the static status parameter and the non-static status parameter. By setting the three types of status parameters, a detection accuracy of the sensor may be improved.

At block 130, the belief function assignment value of each sensor is fused for each status parameter using a D-S evidence combination technology, to obtain a fused belief function assignment value corresponding to each status parameter respectively.

The fused belief function assignment value may be a new belief function assignment value obtained by fusing each status parameter of all sensors according to a combination rule (such as a Dempster combination rule).

In embodiments of the present disclosure, after the assignment values of multiple sensors are obtained under each status parameter, the assignment values of the sensors may be fused for each status parameter using the D-S evidence combination technology. Therefore, a final available fused belief function assignment value for each status parameter may be obtained.

At block 140, a state of the obstacle is judged according to the fused belief function assignment value corresponding to each status parameter respectively.

Correspondingly, in embodiments of the present disclosure, after the fused belief function assignment value is determined for each status parameter respectively by fusing the assignment value of each sensor using the D-S evidence combination technology under each status parameter, the static state of the obstacle may be judged according to the fused belief function assignment value corresponding to each status parameter respectively. In an example, it is assumed that the fused belief function assignment value corresponding to the static status parameter, non-static status parameter and unknown status parameter are (0.8, 0.1, 0.1) respectively, it may be determined that the state of the obstacle is static.

According to embodiments of the present disclosure, based on the real-time obstacle velocities obtained by detecting the obstacle via the at least two sensors, the belief function assignment value of each sensor may be calculated for each of the at least two status parameters respectively. The belief function assignment values of all sensors are fused using the D-S evidence combination technology to obtain the fused belief function assignment value corresponding to each status parameter. The state of the obstacle may be judged according to the fused belief function assignment value corresponding to each status parameter. In the present disclosure, the state of the obstacle may be determined based on the obstacle velocity obtained by multiple sensors. A problem of an inaccurate and unreliable judgement and a misjudgment on the state of the obstacle existing in an unmanned vehicle system may be solved. In addition, in the unmanned vehicle system, independency of algorithm modules and function integrity of a whole integration system may be ensured when judging the state of the obstacle. Thus, a stability, a reliability and an accuracy of judging the state of the obstacle by the unmanned vehicle system may be improved.

Figure 2:
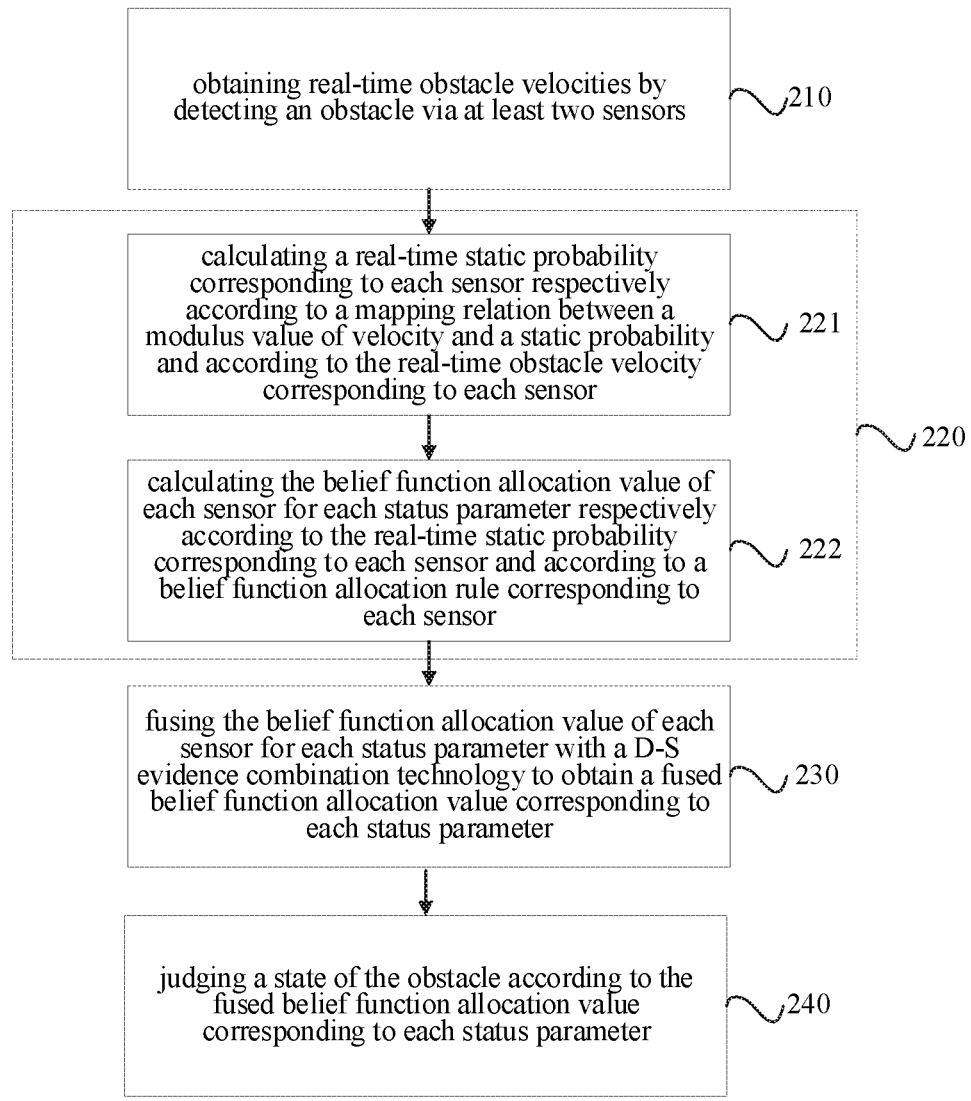
FIG. 2 is a flow chart illustrating a method for determining a static state of an obstacle according to embodiments of the present disclosure.

FIG. 2 is a flow chart illustrating a method for determining a static state of an obstacle according to embodiments of the present disclosure. FIG. 2 illustrates details of the embodiment illustrated in FIG. 1. In embodiments, for each status parameter, implementations of calculating the belief function assignment value of each sensor according to the real-time obstacle velocity corresponding to each sensor are provided. Correspondingly, as illustrated in FIG. 2, the method of the embodiment may include the following.

At block 210, real-time obstacle velocities are obtained by detecting an obstacle via at least two sensors.

At block 220, the belief function assignment value of each sensor is calculated for at least two status parameters respectively according to the real-time obstacle velocity corresponding to each sensor.

Correspondingly, the block 220 may specifically include the following.

At block 221, a real-time static probability corresponding to each sensor is calculated respectively according to a mapping relation between a modulus value of velocity and a static probability, and the real-time obstacle velocity corresponding to each sensor.

The modulus value of velocity may be a modulus value corresponding to the real-time obstacle velocity. The real-time static probability may refer to a static probability of the obstacle at a certain time point.

In embodiments of the present disclosure, the belief function assignment value of each sensor may be determined for each status parameter, based on the mapping relation between the modulus value of velocity and the static probability. In detail, the modulus value of the real-time obstacle velocity corresponding to the sensor may be inputted into the mapping relation between the modulus value of velocity and the static probability, such that the real-time static probability corresponding to each sensor may be obtained.

In an example, the mapping relation between the modulus value of velocity and the static probability may be denoted as:

$$f(v) = \begin{cases} 1, & v < t \\ e^{-(\frac{v-t}{s})^2}, & v \geq t \end{cases};$$

where, v represents the modulus value of velocity, f(v) represents the static probability, t and s represent preset mapping parameters.

Different sensors correspond to mapping parameters of different value ranges.

In embodiments of the present disclosure, v is an independent variable and represents the modulus value of velocity corresponding to the sensor, and t represents a threshold of the modulus value of velocity. When v is smaller than t, a probability may be 1, indicating a completely confidence of the static state; when v is greater than or equal to t, a value of the static probability may decrease as v increases, indicating that a probability of the static state decreases gradually. s represents a proportional value of controlling the probability as the velocity decreases. The greater the s value, the slower the speed of decreasing the probability as the velocity decreases. t and s may be set in advance, such as a constant, and specific values may be set according to actual requirements. Embodiments of the present disclosure do not limit the specific values of t and s. In addition, the value range of the mapping parameter may depend on a property and a category of the sensor.

In an example, the sensor may include a millimeter wave radar or a laser radar. In a case where the sensor is the millimeter wave radar, a value range of t may be (0.5, 1.0) and the value range of s may be (0.1, 0.3). In a case where the sensor is the laser radar, the value range of t may be (0.2, 0.5) and the value range of s may be (0.1, 0.2).

The millimeter wave radar is a radar wording on a band of millimeter wave. The laser radar is a radar system for detecting a position, a velocity and other characteristics of a target by emitting laser. Essentially, both the laser radar and the millimeter wave radar are configured to reconstruct and display the target with an echo imaging technology. However, the laser radar may be susceptible to natural light or thermal radiation. With strong natural light or a strong radiation, a performance of the laser radar may be weakened greatly. Moreover, the laser radar is costly and requires a high technological level. As for the millimeter wave radar, although the millimeter wave radar has a strong anti-interference ability, the millimeter wave radar is limited to distance and accuracy. Moreover, in a driving environment, coexistence of multiple bands may bring an influence on the millimeter wave radar greatly. The millimeter wave radar has a very limited ability in detecting a far-away object. Therefore, the laser radar has better accuracy and reliability than the millimeter wave radar.

In embodiments of the present disclosure, considering that different sensors correspond to the mapping parameters of different value ranges. In some examples, when the sensor is the millimeter wave radar, the value range of t may be (0.5, 1.0) and the value range of s may be (0.1, 0.3). When the sensor is the laser radar, the value range of t may be (0.2, 0.5) and the value range of s may be (0.1, 0.2). Certainly, if the sensor is of another type, the value ranges of t and s may also be preset adaptively.

At block 222, the belief function assignment value of each sensor is calculated for each status parameter respectively according to the real-time static probability corresponding to each sensor and a respective belief function assignment rule corresponding to each sensor.

The belief function assignment rule may be a rule specified to calculate the belief function assignment value of each sensor for each status parameter according to the real-time static probability. It should be noted that, any rule that may reasonably calculate the belief function assignment value of each sensor for each status parameter may be determined as the belief function assignment rule. Embodiments of the present disclosure do not limit the belief function assignment rule.

In embodiments of the present disclosure, the belief function assignment value of each sensor may be calculated for each status parameter respectively according to the real-time static probability corresponding to each sensor and according to a preset belief function assignment rule corresponding to the sensor.

In an example, calculating the belief function assignment value of each sensor respectively for each status parameter according to the real-time static probability corresponding to each sensor and the belief function assignment rule corresponding to the respective sensor may include the following.

The belief function assignment value of the millimeter wave radar is set to 0 for the static state the belief function assignment value of the millimeter wave radar is set to 1−f1(v) for the non-static state, the belief function assignment value of the millimeter wave radar is set to f1(v) for an unknown state, based on a first real-time static probability f1(v) corresponding to the millimeter wave radar.

Alternatively or additionally, the belief function assignment value of the laser radar is set to f2(v) for the static state, the belief function assignment value of the laser radar is set to 1−f2(v) for the non-static state, and the belief function assignment value of the laser radar is set to 0 for the unknown state, according to a second real-time static probability f2(v) corresponding to the laser radar.

The first real-time static probability is the real-time static probability calculated by the millimeter wave radar, while the second real-time static probability is the real-time static probability calculated by the laser radar.

In embodiments of the present disclosure, due to a low accuracy and a poor stability of the millimeter wave radar, a reliability of the real-time static probability calculated by the millimeter wave radar is low. Thus, the belief function assignment rule specified for the millimeter wave radar may be as follows. The first real-time static probability f1(v) calculated by the millimeter wave radar is determined as the belief function assignment value of the millimeter wave radar for the unknown status parameters and 1−f1(v) is determined as the belief function assignment value of the millimeter wave radar for the non-static status parameter. Correspondingly, the belief function assignment value of the millimeter wave radar for the static status parameter may be set to 0. Due to a high accuracy and a good stability of the laser radar, the reliability of the real-time static probability calculated by the laser radar is high. Thus, the belief function assignment rule specified for the laser radar may be as follows. The calculated second real-time static probability $f2(v)$ may be determined as the belief function assignment value of the laser radar for the static status parameter. $1-f2(v)$ may be determined as the belief function assignment value of the laser radar for the non-static status parameter. Correspondingly, the belief function assignment value of the laser radar for the unknown status parameters may be set to 0.

That is, the first real-time static probability obtained by mapping the real-time obstacle velocity detected by the millimeter wave radar may be assigned to the unknown status parameter and the non-static status parameter. The second real-time static probability obtained by mapping the real-time obstacle velocity detected by the laser radar may be assigned to the static status parameter and the non-static status parameter. For example, for the millimeter wave radar, in a case where the calculated first real-time static probability $f1(v)$ is 0.2, the belief function assignment value corresponding to the static status parameter may be 0, the belief function assignment value corresponding to the non-static status parameter may be 0.8, and the belief function assignment value corresponding to the unknown status parameter may be 0.2 for. For the laser radar, in a case where the calculated second real-time static probability $f2(v)$ is 0.2, the belief function assignment value corresponding to the static status parameter may be 0.2, the belief function assignment value corresponding to the non-static status parameter may be 0.8, and the belief function assignment value corresponding to the unknown status parameter may be 0.

At block 230, the belief function assignment value of each sensor is fused using a D-S evidence combination technology, for each status parameter, to obtain a fused belief function assignment value corresponding to each status parameter respectively.

In detail, the belief function assignment value of each sensor may be fused for status parameter through various fusion algorithms of the existing D-S evidence fusion technology, such that the fused belief function assignment value finally obtained may simultaneously take multiple real-time obstacle velocities detected by the sensors into account.

At block 240, a state of the obstacle is judged according to the fused belief function assignment value corresponding to each status parameter.

With the above technical solution, through using the mapping relation between the modulus value of velocity and the static probability and using the belief function assignment rule corresponding to the respective sensor, the belief function assignment value of each sensor may be calculated for each status parameter respectively according to the real-time obstacle velocity corresponding to each sensor. Further, the belief function assignment value of each sensor is fused for each status parameter with the D-S evidence combination technology to obtain the fused belief function assignment value corresponding to each status parameter respectively. The state of the obstacle may be judged according to the fused belief function assignment value corresponding to each status parameter. In the unmanned vehicle system, independency of algorithm modules and function integrity of a whole integration system may be ensured when judging the state of the obstacle. Thus, a stability, a reliability and an accuracy of judging the state of the obstacle by the unmanned vehicle system may be improved.

Figure 3:
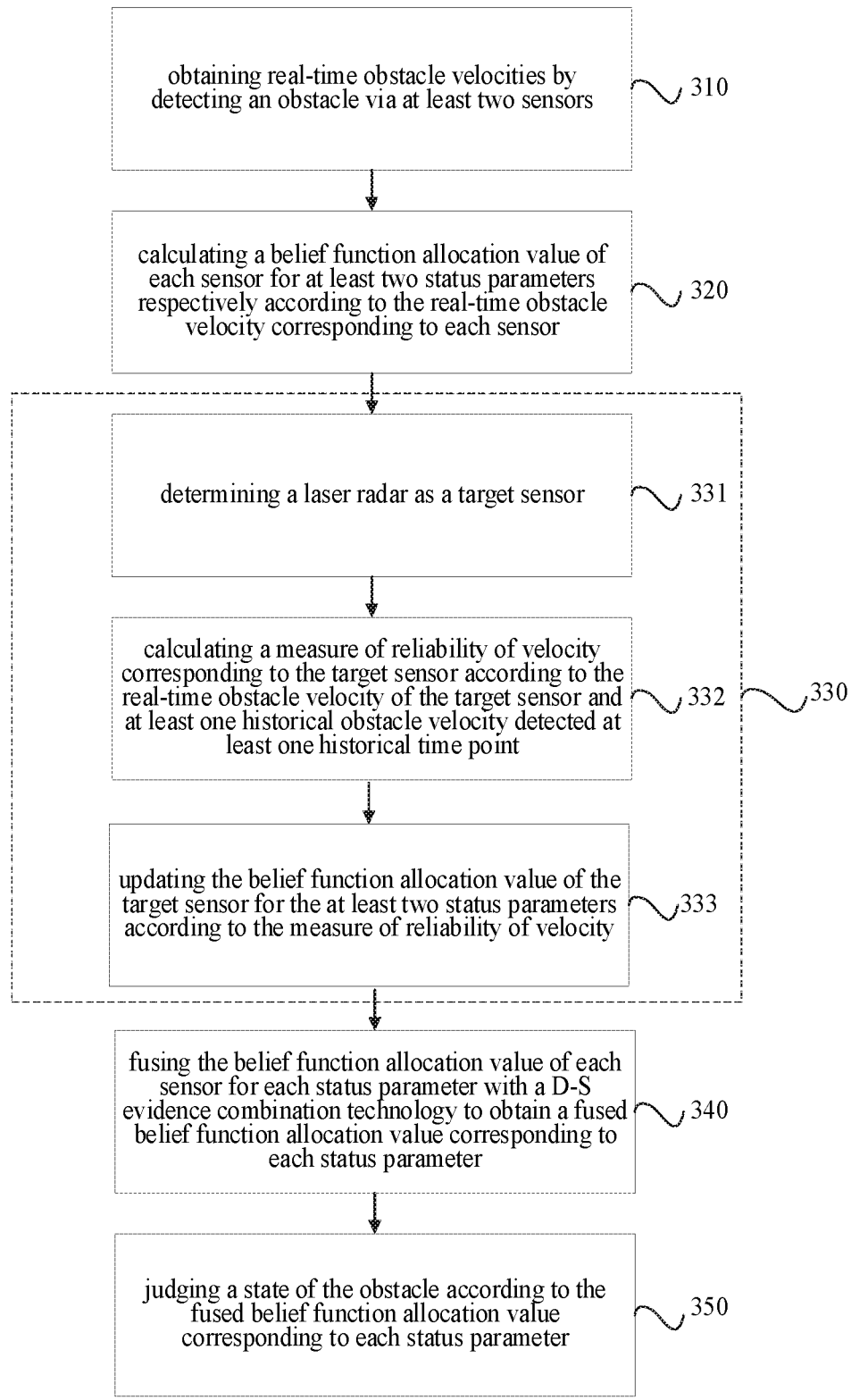
FIG. 3 is a flow chart illustrating a method for determining a static state of an obstacle according to embodiments of the present disclosure.

FIG. 3 is a flow chart illustrating a method for determining a static state of an obstacle according to embodiments of the present disclosure. FIG. 3 illustrates details of embodiments illustrated in FIGS. 1 and 2. In embodiments, the implementations of the method are provided after the belief function assignment value of each sensor is calculated respectively for the at least two status parameters according to the real-time obstacle velocity corresponding to a respective sensor. Correspondingly, as illustrated in FIG. 3, the method may include the following.

At block 310, real-time obstacle velocities are obtained by detecting an obstacle via at least two sensors.

At block 320, a belief function assignment value of each sensor is calculated for at least two status parameters according to the real-time obstacle velocity corresponding to each sensor.

At block 330, the belief function assignment value of each sensor for the at least two status parameters are updated according to the real-time obstacle velocity detected by each sensor and a historical obstacle velocity.

The historical obstacle velocity may be an obstacle velocity detected before a time point when the real-time obstacle velocity is detected.

In embodiments of the present disclosure, considering that a change in the obstacle velocity is usually continuous, that is, the obstacle velocity may not change abruptly, a correlation may exist between the real-time obstacle velocity and the historical obstacle velocity. Therefore, the calculated belief function assignment value of each sensor for each status parameter may be corrected and updated using the historical obstacle velocity of the obstacle, to ensure an accuracy of the belief function assignment value of each sensor for each status parameter.

Correspondingly, the block 300 may include the following.

At block 331, a laser radar is determined as a target sensor.

It should be noted that, due to a low accuracy and a poor stability of a millimeter wave radar, an accuracy and a reliability of detecting the historical obstacle velocity may be low and it may be not reliable to use the historical obstacle velocity detected by the millimeter wave radar to update the belief function assignment value for each status parameter. Therefore, in embodiments of the present disclosure, the laser radar may be determined as the target sensor to update the belief function assignment value of the laser radar for each status parameter by using the historical obstacle velocity.

At block 332, a measure of reliability of velocity corresponding to the target sensor is calculated according to the real-time obstacle velocity detected by the target sensor and at least one historical obstacle velocity detected at least one historical time point.

The measure of reliability of velocity may be used to correct and update the belief function assignment value for each status parameter.

In embodiments of the present disclosure, a relation between the real-time obstacle velocity and the at least one historical obstacle velocity may be used to calculate the measure of reliability of velocity corresponding to the target sensor. In some examples, five historical obstacle velocities may be selected. The number may be selected according to actual requirements, which is not limited in embodiments of the present disclosure.

In an example, calculating the measure of reliability of velocity corresponding to the target sensor according to the real-time obstacle velocity of the target sensor and at least one historical obstacle velocity detected at least one historical time point may include the following.

The measure of reliability of velocity α corresponding to the target sensor may be calculated using a formula of:

$$\alpha = \text{mean}\left(\frac{s_{max}}{\max(s_{max}, fabs(v_{t-i} - v_t))}\right),$$
$$i = 1, 2, \ldots, w$$

where, $s_{max}$ represents a maximum allowable error of velocity, $v_t$ represents the real-time obstacle velocity detected at a current time point t, $v_{t-i}$ represents the historical obstacle velocity detected at $i^{th}$ previous time point before the current time point t; fabs ( ) represents an absolute value function, max ( ) represents a maximum value function for obtaining; mean ( ) represents a mean value function.

In an example, $s_{max}$ may be a preset maximum allowable error of velocity. For example, $s_{max}$ may be 0.4. The value of $s_{max}$ may be set adaptively according to a sensitivity and an accuracy of the target sensor, which is not limited in embodiments of the present disclosure. In an example, w is a length of a history time window.

In an example, given that w equal to 2, after the real-time obstacle velocity $v_t$ is obtained by the target sensor at the current time point t, the historical obstacle velocity $v_{i-1}$ may be obtained by the target sensor at a first historical time point before the current time point t and the historical obstacle velocity $v_{i-2}$ may be obtained by the target sensor at a second previous time point before the current time point t.

After it is calculated that $$A1 = \frac{s_{max}}{\max(s_{max}, fabs(v_{t-1} - v_t))}$$

and $$A1 = \frac{s_{max}}{\max(s_{max}, fabs(v_{t-2} - v_t))}$$

with the function of mean (A1, A2), a mean value of A1 and A2 may be calculated.

As can be seen from the above, in a case where a difference between the historical obstacle velocity and the real-time obstacle velocity is smaller than the preset maximum allowable error of velocity, a current error of the real-time obstacle velocity may be negligible. Otherwise, the greater the difference between the historical obstacle velocity and the real-time obstacle velocity, the smaller the measure of reliability of velocity corresponding to the target sensor, indicating a reliability of the belief function assignment value measured by the target sensor is low.

At block 333, the belief function assignment values of the target sensor are updated for the at least two status parameters according to the measure of reliability of velocity.

Correspondingly, after the measure of reliability of velocity corresponding to the target sensor is obtained, the belief function assignment value of the target sensor may be updated for each status parameter according to the measure of reliability of velocity.

In an example, updating the belief function assignment value of the target sensor for the at least two status parameters according to the measure of reliability of velocity may include the following. The belief function assignment value M1 of the target sensor for a static state may be set as M1*α, the belief function assignment value M2 of the target sensor for a non-static state may be set as M2*α, and the belief function assignment value of the target sensor for an unknown state may be set as 1−M1*α−M2*α.

Correspondingly, after the measure of reliability of velocity corresponding to the target sensor is obtained, the belief function assignment value M1 of the target sensor for the static state may be set as M1*α and the belief function assignment value M2 of the target sensor for the non-static state may be set as M2*α respectively. Since a sum of the belief function assignment values corresponding to the static status parameter, the non-static status parameter and the unknown status parameter is 1, the belief function assignment value of the target sensor for the unknown state is set as 1−M1*α−M2*α.

For example, before the belief function assignment value is updated, the belief function assignment value of the target sensor may be 0.2 for the static state, the belief function assignment value of the target sensor may be 0.8 for the non-static state, and function assignment value of the target sensor may be 0 for the unknown state. When the measure of reliability of velocity α is 0.7, the updated belief function assignment value of the target sensor may be 0.14 for the static state, the belief function assignment value may be 0.56 for the non-static state, and belief function assignment value may be 0.3 for the unknown state.

At block 340, the belief function assignment value of each sensor is fused for each status parameter with a D-S evidence combination technology to obtain a fused belief function assignment value corresponding to each status parameter.

At block 350, a state of the obstacle is judged according to the fused belief function assignment value corresponding to each status parameter.

With the technical solution, the belief function assignment value of each sensor may be updated for each status parameter according to the real-time obstacle velocity detected by the sensor and the historical obstacle velocity, which may effectively improve an accuracy of detecting the real-time obstacle velocity. Thus, a stability, a reliability and an accuracy of judging the state of the obstacle by the unmanned vehicle system may be further improved.

Figure 4:
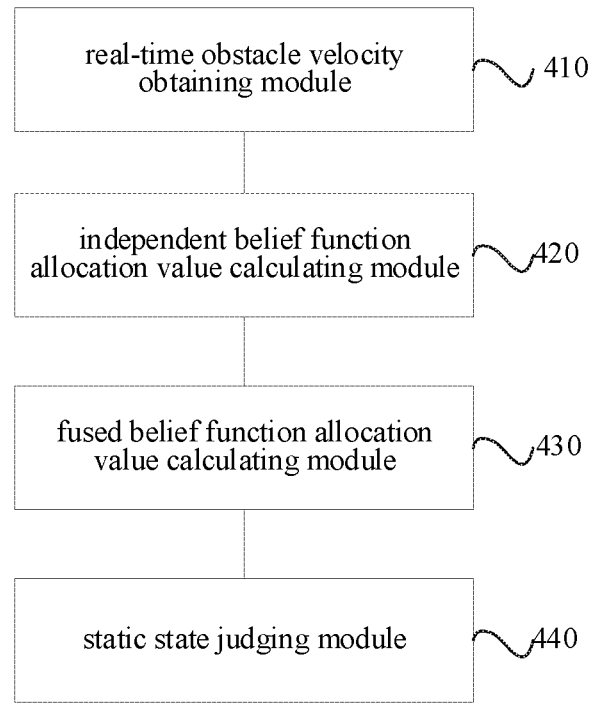
FIG. 4 is a block diagram illustrating an apparatus for determining a static state of an obstacle according to embodiments of the present disclosure.

FIG. 4 is a block diagram illustrating an apparatus for determining a static state of an obstacle according to embodiments of the present disclosure. As illustrated in FIG. 4, the apparatus may include a real-time obstacle velocity obtaining module 410, an independent belief function assignment value calculating module 420, a fused belief function assignment value calculating module 430 and a state judging module 440.

The real-time obstacle velocity obtaining module 410 may be configured to obtain real-time obstacle velocities by detecting an obstacle via at least two sensors.

The independent belief function assignment value calculating module 420 may be configured to calculate a belief function assignment value of each sensor for at least two status parameters respectively according to the real-time obstacle velocity corresponding to each sensor.

The fused belief function assignment value calculating module 430 may be configured to fuse the belief function assignment value of each sensor for each status parameter with a D-S evidence combination technology to obtain a fused belief function assignment value corresponding to each status parameter.

The state judging module 440 may be configured to judge a state of the obstacle according to the fused belief function assignment value corresponding to each status parameter.

According to embodiments of the present disclosure, based on the real-time obstacle velocities obtained by detecting the obstacle via the at least two sensors, the belief function assignment value of each sensor may be calculated for the at least two status parameters respectively. Each belief function assignment value is fused with the D-S evidence combination technology to obtain the fused belief function assignment value corresponding to each status parameter. The state of the obstacle is judged according to the fused belief function assignment value corresponding to each status parameter. In the present disclosure, the state of the obstacle may be determined based on the obstacle velocity obtained by multiple sensors. A problem of an inaccurate and unreliable judgement and a misjudgment on the state of the obstacle existing in an unmanned vehicle system may be solved. In addition, in the unmanned vehicle system, independency of algorithm modules and function integrity of a whole integration system may be ensured when judging the state of the obstacle. Thus, a stability, a reliability and an accuracy of judging the state of the obstacle by the unmanned vehicle system may be improved.

In an example, the status parameter may be static, non-static, and unknown.

In an example, the independent belief function assignment value calculating module 420 may include a real-time static probability calculating unit and a belief function assignment value calculating unit. The real-time static probability calculating unit may be configured to calculate the real-time static probability corresponding to each sensor respectively according to a mapping relation between a modulus value of velocity and a static probability and according to the real-time obstacle velocity corresponding to each sensor. The belief function assignment value calculating unit may be configured to calculate a belief function assignment value of each sensor for each status parameter respectively according to the real-time static probability corresponding to each sensor and a respective belief function assignment rule corresponding to each sensor.

In an example, the sensor may include a millimeter wave radar or a laser radar.

In an example, the mapping relation between the modulus value of velocity and the static probability may includes $$f(v) = \begin{cases} 1, & v < t \\ e^{-(\frac{v-t}{s})^2}, & v \geq t \end{cases};$$

where, v represents the modulus value of velocity, f(v) represents the static probability, t and s represent preset mapping parameters. Different sensors correspond to mapping parameters of different value ranges.

In an example, in a case where the sensor is the millimeter wave radar, the value range of t may be (0.5, 1.0) and the value range of s may be (0.1, 0.3).

In a case where the sensor is the laser radar, the value range of t may be (0.2, 0.5) and the value range of s may be (0.1, 0.2).

In an example, the belief function assignment value calculating unit may be further configured to set the belief function assignment value of the millimeter wave radar for the static state as 0, set the belief function assignment value of the millimeter wave radar for the non-static state as $1-f1(v)$ and set the belief function assignment value of the millimeter wave radar for the unknown state as $f1(v)$ according to the first real-time static probability $f1(v)$ corresponding to the millimeter wave radar.

Alternatively and/or additionally, the belief function assignment value calculating unit may be further configured to set the belief function assignment value of the laser radar for the static state as $f2(v)$, set the belief function assignment value of the laser radar for the non-static state as $1-f2(v)$, and set the belief function assignment value of the laser radar for the unknown state as 0, according to the second real-time static probability $f2(v)$ corresponding to the laser radar.

In an example, the apparatus may further include a belief function assignment value updating module. The belief function assignment value updating module may be configured to update the belief function assignment value of each sensor for the at least two status parameters according to the real-time obstacle velocity detected by each sensor and a historical obstacle velocity.

In an example, the belief function assignment value updating module may include a target sensor obtaining unit, a measure of reliability of velocity calculating unit, and a belief function assignment value updating unit. The target sensor obtaining unit may be configured to determine a laser radar as a target sensor. The measure of reliability of velocity calculating unit may be configured to calculate a measure of reliability of velocity corresponding to the target sensor according to the real-time obstacle velocity of the target sensor and at least one historical obstacle velocity detected at least one historical time point. The belief function assignment value updating unit may be configured to update the belief function assignment value of the target sensor for the at least two status parameters according to the measure of reliability of velocity.

In an example, the measure of reliability of velocity calculating unit may be further configured to calculate the measure of reliability of velocity α corresponding to the target sensor by a formula of:

$$\alpha = \text{mean}\left(\frac{s_{max}}{\max(s_{max}, fabs(v_{t-i} - v_t))}\right),$$

$$i = 1, 2, \ldots, w$$

where, $s_{max}$ represents a maximum allowable error of velocity, $v_t$ represents the real-time obstacle velocity detected at a current time point t, $v_{t-i}$ represents the historical obstacle velocity detected at $i^{th}$ previous time point before the current time point t; fabs ( ) represents an absolute value function, max ( ) represents a maximum value function for obtaining; mean ( ) represents a mean value function.

In an embodiment, the belief function assignment value updating unit may be further configured to set the belief function assignment value M1 of the target sensor for the static state as $M1*\alpha$, set the belief function assignment value M2 of the target sensor for the non-static state as $M2*\alpha$, and set the belief function assignment value of the target sensor for the unknown state as $1-M1*\alpha-M2*\alpha$.

The apparatus for determining a static state of an obstacle may be configured to execute the method for determining a static state of an obstacle according to any of embodiments of the present disclosure, and may have corresponding function modules for executing the method and beneficial effects. Technical details not fully described in the embodiment may refer to the method for determining a static state of an obstacle according to any of embodiments of the present disclosure.

Figure 5:
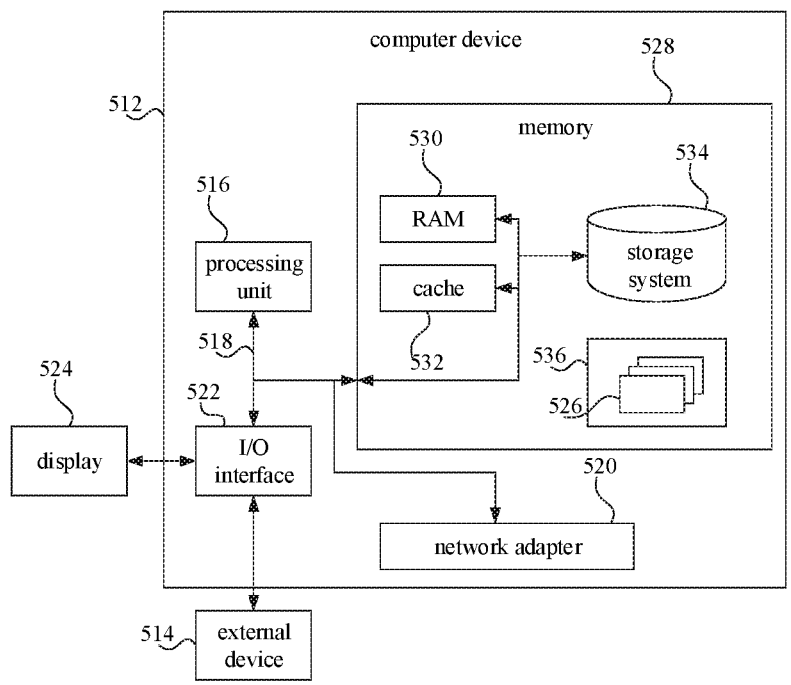
FIG. 5 is a block diagram illustrating a computer device according to embodiments of the present disclosure.

FIG. 5 is a block diagram illustrating a computer device according to embodiments of the present disclosure. A block diagram of a computer device 512 for implementing embodiments of the present disclosure is illustrated in FIG. 5. The computer device 512 illustrated in FIG. 5 is only an example, and should not be considered as any restriction on the function and the usage range of embodiments of the present disclosure.

As illustrated in FIG. 5, the computer device 512 is in the form of a general-purpose computing apparatus. The computer device 512 may include, but is not limited to, one or more processors or processing units 516, a system memory 528, and a bus 518 connecting different system components (including the system memory 528 and the processing unit 516).

The bus 518 represents one or more of several types of bus architectures, including a memory bus or a memory control bus, a peripheral bus, a graphic acceleration port (GAP) bus, a processor bus, or a local bus using any bus architecture in a variety of bus architectures. For example, these architectures include, but are not limited to, an industry standard architecture (ISA) bus, a micro-channel architecture (MCA) bus, an enhanced ISA bus, a video electronic standard association (VESA) local bus, and a peripheral component interconnect (PCI) bus.

Typically, the computer device 512 may include multiple kinds of computer-readable media. These media may be any storage media accessible by the computer device 512, including transitory or non-transitory storage medium and movable or unmovable storage medium.

The memory 528 may include a computer-readable medium in a form of volatile memory, such as a random access memory (RAM) 530 and/or a high-speed cache memory 532. The computer device 512 may further include other transitory/non-transitory storage media and movable/unmovable storage media. In way of example only, the storage system 534 may be used to read and write non-removable, non-volatile magnetic media (not shown in the figure, commonly referred to as "hard disk drives"). Although not illustrated in FIG. 5, it may be provided a disk driver for reading and writing movable non-volatile magnetic disks (e.g. "floppy disks"), as well as an optical driver for reading and writing movable non-volatile optical disks (e.g. a compact disc read only memory (CD-ROM, a digital video disc read only Memory (DVD-ROM), or other optical media). In these cases, each driver may be connected to the bus 518 via one or more data medium interfaces. The memory 528 may include at least one program product, which has a set of (for example at least one) program modules configured to perform the functions of embodiments of the present disclosure.

A program/application 536 with a set of (at least one) program modules 526 may be stored in memory 528, the program modules 526 may include, but not limit to, an operating system, one or more application programs, other program modules and program data, and any one or combination of above examples may include an implementation in a network environment. The program modules 526 are generally configured to implement functions and/or methods described in embodiments of the present disclosure.

The computer device 512 may also communicate with one or more external devices 514 (e.g., a keyboard, a pointing device, a display 524, and etc.) and may also communicate with one or more devices that enables a user to interact with the computer system/server 512, and/or any device (e.g., a network card, a modem, and etc.) that enables the computer system/server 512 to communicate with one or more other computing devices. This kind of communication can be achieved by the input/output (I/O) interface 522. In addition, the computer device 512 may be connected to and communicate with one or more networks such as a local area network (LAN), a wide area network (WAN) and/or a public network such as the Internet through a network adapter 520. As shown in FIG. 5, the network adapter 520 communicates with other modules of the computer device 512 over bus 518. It should be understood that although not shown in the figure, other hardware and/or software modules may be used in combination with the computer device 512, which including, but not limited to, microcode, device drivers, redundant processing units, external disk drive arrays, Redundant Arrays of Independent Disks (RAID) systems, tape drives, as well as data backup storage systems and the like.

The processing unit 516 may perform various functional applications and data processing by running programs stored in the system memory 528, for example, to perform the method for determining a static state of an obstacle provided by embodiments of the present disclosure.

That is, the processing unit may be configured to: obtain real-time obstacle velocities by detecting an obstacle via at least two sensors; calculate a belief function assignment value of each sensor for at least two status parameters respectively according to the real-time obstacle velocity corresponding to each sensor; fuse the belief function assignment value of each sensor for each the status parameter with a D-S evidence combination technology to obtain a fused belief function assignment value corresponding to each status parameter; and judge a state of the obstacle according to the fused belief function assignment value corresponding to each status parameter.

Based on the real-time obstacle velocities obtained by the computer device by detecting the obstacle via at least two sensors, the belief function assignment value of each sensor may be calculated respectively for the at least two status parameters. The belief function assignment value of each sensor is fused with the D-S evidence combination technology to obtain the fused belief function assignment value corresponding to each status parameter. The state of the obstacle may be judged according to the fused belief function assignment value corresponding to each status parameter. In the present disclosure, the state of the obstacle may be determined based on the obstacle velocity obtained by multiple sensors. A problem of an inaccurate and unreliable judgement and a misjudgment on the state of the obstacle existing in an unmanned vehicle system may be solved. In addition, in the unmanned vehicle system, independency of algorithm modules and function integrity of a whole integration system may be ensured when judging the state of the obstacle. Thus, a stability, a reliability and an accuracy of judging the state of the obstacle by the unmanned vehicle system may be improved.

The present disclosure further provides a computer readable storage medium, having computer programs stored thereon that when executed by a processor cause the processor to perform the method for determining a static state of an obstacle. The method may include: obtaining real-time obstacle velocities by detecting an obstacle via at least two sensors; calculating a belief function assignment value of each sensor for at least two status parameters respectively according to the real-time obstacle velocity corresponding to each sensor; fusing the belief function assignment value of each sensor under each status parameter with the D-S evidence combination technology to obtain a fused belief function assignment value corresponding to each status parameter; and judging a state of the obstacle according to the fused belief function assignment value corresponding to each status parameter.

The above storage medium including the computer executable instructions may adopt any combination of one or more computer readable media. The computer readable medium may be a computer readable signal medium or a computer readable storage medium. The computer readable storage medium may be, but is not limited to, for example, an electrical, magnetic, optical, electromagnetic, infrared, or semiconductor system, apparatus, device, component or any combination thereof. A specific example of the computer readable storage media include (a non-exhaustive list): an electrical connection having one or more wires, a portable computer disk, a hard disk, a random access memory (RAM), a read only memory (ROM), an Erasable Programmable Read Only Memory (EPROM) or a flash memory, an optical fiber, a compact disc read-only memory (CD-ROM), an optical memory component, a magnetic memory component, or any suitable combination thereof. In context, the computer readable storage medium may be any tangible medium including or storing programs. The programs may be used by an instruction executed system, apparatus or device, or a connection thereof.

The computer readable signal medium may include a data signal propagating in baseband or as part of carrier which carries a computer readable program codes. Such propagated data signal may be in many forms, including but not limited to an electromagnetic signal, an optical signal, or any suitable combination thereof. The computer readable signal medium may also be any computer readable medium other than the computer readable storage medium, which may send, propagate, or transport programs used by an instruction executed system, apparatus or device, or a connection thereof.

The program code stored on the computer readable medium may be transmitted using any appropriate medium, including but not limited to wireless, wireline, optical fiber cable, RF, or any suitable combination thereof.

The computer program code for carrying out operations of embodiments of the present disclosure may be written in one or more programming languages. The programming language includes an object oriented programming language, such as Java, Smalltalk, C++, as well as conventional procedural programming language, such as "C" language or similar programming language. The program code may be executed entirely on a user's computer, partly on the user's computer, as a separate software package, partly on the user's computer, partly on a remote computer, or entirely on the remote computer or server. In a case of the remote computer, the remote computer may be connected to the user's computer or an external computer (such as using an Internet service provider to connect over the Internet) through any kind of network, including a Local Area Network (hereafter referred as to LAN) or a Wide Area Network (hereafter referred as to WAN).

On the basis of the described embodiments, embodiments of the present disclosure further provide a vehicle, including a vehicle body, the computer device according to any of embodiments of the present disclosure and at least two sensors arranged on the vehicle body. The at least two sensors are configured to detect real-time obstacle velocities of an obstacle in a surrounding environment.

Typically, the sensor may include a millimeter wave radar and a laser radar.

It should be noted that, the above are only preferred embodiments and applied technical principles of the present disclosure. Those skilled in the art should understand that, the present disclosure is not limited to the specific embodiments described herein, and various obvious changes, readjustments and substitutions that are made by those skilled in the art will not depart from the scope of the present disclosure. Therefore, although the present disclosure has been described in detail by the above embodiments, the present disclosure is not limited to the above embodiments, and more other equivalent embodiments may be included without departing from the concept of the present disclosure, and the scope of the present disclosure is determined by the scope of the appended claims.

What is claimed is:

1. A method for determining a static state of an obstacle, comprising:
    obtaining real-time obstacle velocities by detecting an obstacle via at least two sensors;
    calculating a belief function assignment value of each sensor for at least two status parameters respectively according to the real-time obstacle velocity corresponding to each sensor;
    fusing the belief function assignment value of each sensor for each status parameter with a Dempster combination rule to obtain a fused belief function assignment value corresponding to each status parameter; and
    judging a state of the obstacle according to the fused belief function assignment value corresponding to each status parameter;
    wherein calculating the belief function assignment value of each sensor for the at least two status parameters respectively according to the real-time obstacle velocity corresponding to each sensor comprises:
    calculating a real-time static probability corresponding to each sensor respectively according to a mapping relation between a modulus value of velocity and a static probability and based on the real-time obstacle velocity corresponding to each sensor; and
    calculating the belief function assignment value of each sensor for each status parameter respectively according to the real-time static probability corresponding to each sensor and a respective belief function assignment rule corresponding to each sensor.

2. The method of claim 1, wherein the status parameter comprises a static status parameter, a non-static status parameter, and an unknown status parameter.

3. The method of claim 1, wherein the sensor comprises a millimeter wave radar or a laser radar.

4. The method of claim 3, wherein the mapping relation between the modulus value of velocity and the static probability comprises:

$$f(v) = \begin{cases} 1, & v < t \\ e^{-\left(\frac{v-t}{s}\right)^2}, & v \geq t \end{cases}$$

where, v represents the modulus value of velocity, f (v) represents the static probability, t and s each represents a preset mapping parameter; and
    wherein, different sensors correspond to mapping parameters of different value ranges.

5. The method of claim 4, wherein,
    in response to determining that the sensor is the millimeter wave radar, a value range of t is (0.5, 1.0) and the value range of s is (0.1, 0.3); and in response to determining that the sensor is the laser radar, the value range of t is (0.2, 0.5) and the value range of s is (0.1, 0.2).

6. The method of claim 3, wherein calculating the belief function assignment value of each sensor for each status parameter respectively according to the real-time static probability corresponding to each sensor and the respective reliability function assignment rule corresponding to each sensor comprises:

setting the belief function assignment value of the millimeter wave radar for a static state as 0, setting the belief function assignment value of the millimeter wave radar for a non-static state as 1−f1(v) setting the belief function assignment value of the millimeter wave radar for an unknown state as f1(v), according to a first real-time static probability f1(v) corresponding to the millimeter wave radar; and/or setting the belief function assignment value of the laser radar for the static state as f2(v), setting the belief function assignment value of the laser radar for the non-static state as 1−f2(v) setting the belief function assignment value of the laser radar for the unknown state as 0, according to a second real-time static probability f2(v) corresponding to the laser radar.

7. The method of claim 1, wherein after calculating the belief function assignment value of each sensor for the at least two status parameters respectively according to the real-time obstacle velocity corresponding to each sensor, the method further comprises:

updating the belief function assignment value of each sensor for the at least two status parameters according to the real-time obstacle velocity detected by each sensor and a historical obstacle velocity.

8. The method of claim 7, wherein updating the belief function assignment value of each sensor for the at least two status parameters according to the real-time obstacle velocity detected by each sensor and the historical obstacle velocity comprises:

determining a laser radar as a target sensor;

calculating a measure of reliability of velocity corresponding to the target sensor according to the real-time obstacle velocity of the target sensor and at least one historical obstacle velocity detected at least one historical time point; and updating the belief function assignment value of the target sensor for the at least two status parameters according to the measure of reliability of velocity.

9. The method of claim 8, wherein calculating the measure of reliability of velocity corresponding to the target sensor according to the real-time obstacle velocity of the target sensor and the at least one historical obstacle velocity detected at the least one historical time point comprises:

calculating the measure of reliability of velocity α corresponding to the target sensor by a formula of:

$$\alpha = \text{mean}\left(\frac{s_{max}}{\max(s_{max}, fabs(v_{t-i} - v_t))}\right),$$
$$i = 1, 2, \ldots, w$$

where, $s_{max}$ represents a maximum allowable error of velocity, $v_t$ represents the real-time obstacle velocity detected at a current time point t, $v_{t-i}$ represents the historical obstacle velocity detected at $i^{th}$ previous time point before the current time point t; fabs( ) represents an absolute value function, max( ) represents a maximum value function for obtaining; mean( ) represents a mean value function.

10. The method of claim 9, wherein updating the belief function assignment value of the target sensor for the at least two status parameters according to the measure of reliability of velocity comprises:

setting the belief function assignment value M1 of the target sensor for a static state as M1*α, setting the belief function assignment value M2 of the target sensor for a non-static state as M2*α, and setting the belief function assignment value of the target sensor for an unknown state as 1−M1*α−M2*α.

11. An electronic device, comprising:
one or more processors; and
a memory, configured to store one or more programs that when executed by the one or more processors cause the one or more processors to:
obtain real-time obstacle velocities by detecting an obstacle via at least two sensors;
calculate a belief function assignment value of each sensor for at least two status parameters respectively according to the real-time obstacle velocity corresponding to each sensor;
fuse the belief function assignment value of each sensor for each status parameter with a Dempster combination rule to obtain a fused belief function assignment value corresponding to each status parameter; and
judge a state of the obstacle according to the fused belief function assignment value corresponding to each status parameter,
wherein the one or more processors are caused to calculate the belief function assignment value of each sensor for the at least two status parameters respectively according to the real-time obstacle velocity corresponding to each sensor by:
calculating a real-time static probability corresponding to each sensor respectively according to a mapping relation between a modulus value of velocity and a static probability and based on the real-time obstacle velocity corresponding to each sensor; and
calculating the belief function assignment value of each sensor for each status parameter respectively according to the real-time static probability corresponding to each sensor and a respective belief function assignment rule corresponding to each sensor.

12. The electronic device of claim 11, wherein the status parameter comprises a static status parameter, a non-static status parameter, and an unknown status parameter.

13. The electronic device of claim 12, wherein the sensor comprises a millimeter wave radar or a laser radar.

14. The electronic device of claim 13, wherein the mapping relation between the modulus value of velocity and the static probability comprises:

$$f(v) = \begin{cases} 1, & v < t \\ e^{-\left(\frac{v-t}{s}\right)^2}, & v \geq t \end{cases}$$

where, v represents the modulus value of velocity, f(v) represents the static probability, t and s each represents a preset mapping parameter; and wherein, different sensors correspond to mapping parameters of different value ranges.

15. The electronic device of claim 14, wherein,
in response to determining that the sensor is the millimeter wave radar, a value range of t is (0.5, 1.0) and the value range of s is (0.1, 0.3); and
in response to determining that the sensor is the laser radar, the value range of t is (0.2, 0.5) and the value range of s is (0.1, 0.2).

16. The electronic device of claim 13, wherein the one or more processors are caused to calculate the belief function assignment value of each sensor for each status parameter respectively according to the real-time static probability corresponding to each sensor and the respective reliability function assignment rule corresponding to each sensor by:
setting the belief function assignment value of the millimeter wave radar for a static state as 0, setting the belief function assignment value of the millimeter wave radar for a non-static state as 1−f1(v), setting the belief function assignment value of the millimeter wave radar for an unknown state as f1(v), according to a first real-time static probability f1(v) corresponding to the millimeter wave radar; and/or
setting the belief function assignment value of the laser radar for the static state as f2(v), setting the belief function assignment value of the laser radar for the non-static state as 1−f2(v), setting the belief function assignment value of the laser radar for the unknown state as 0, according to a second real-time static probability f2(v) corresponding to the laser radar.

17. The electronic device of claim 11, wherein the one or more processors are further caused to:
update the belief function assignment value of each sensor for the at least two status parameters according to the real-time obstacle velocity detected by each sensor and a historical obstacle velocity.

18. A non-transitory computer readable storage medium, having computer programs stored thereon that when executed by a processor cause the processor to perform the method for determining a static state of an obstacle, the method comprising:
obtaining real-time obstacle velocities by detecting an obstacle via at least two sensors;
calculating a belief function assignment value of each sensor for at least two status parameters respectively according to the real-time obstacle velocity corresponding to each sensor;
fusing the belief function assignment value of each sensor for each status parameter with a Dempster combination rule to obtain a fused belief function assignment value corresponding to each status parameter; and
judging a state of the obstacle according to the fused belief function assignment value corresponding to each status parameter;
wherein calculating the belief function assignment value of each sensor for the at least two status parameters respectively according to the real-time obstacle velocity corresponding to each sensor comprises:
calculating a real-time static probability corresponding to each sensor respectively according to a mapping relation between a modulus value of velocity and a static probability and based on the real-time obstacle velocity corresponding to each sensor; and
calculating the belief function assignment value of each sensor for each status parameter respectively according to the real-time static probability corresponding to each sensor and a respective belief function assignment rule corresponding to each sensor.

* * * * *